Jan. 15, 1957  G. H. ASHTON ET AL  2,777,491
MANUFACTURE OF DRAW-CORD BAGS AND THE PRODUCT THEREOF
Filed Oct. 13, 1954  2 Sheets-Sheet 1
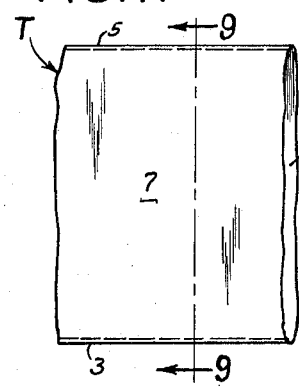
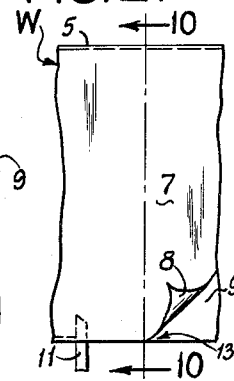
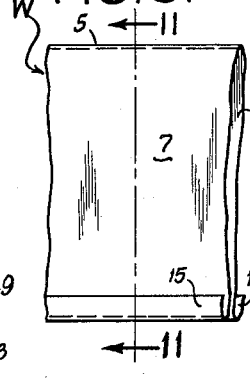
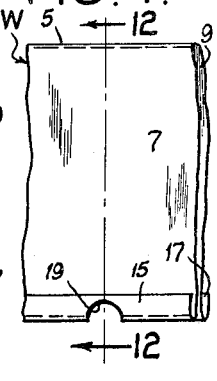
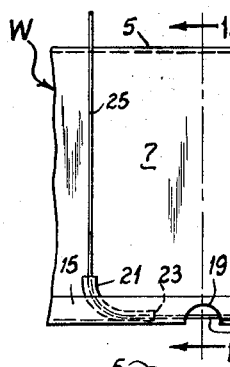
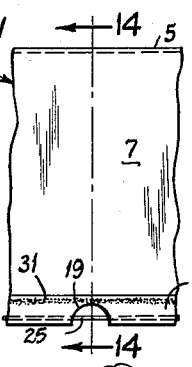
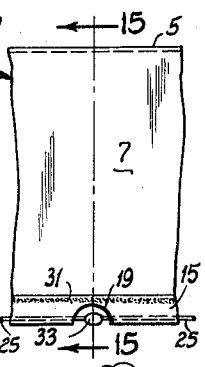
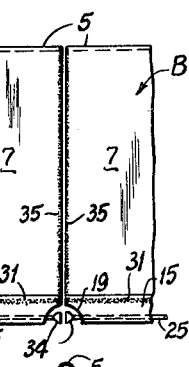
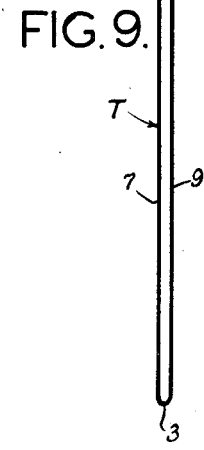
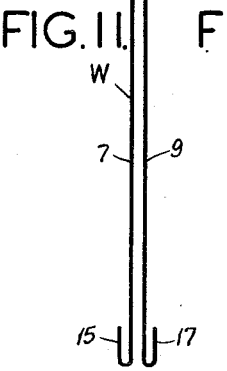
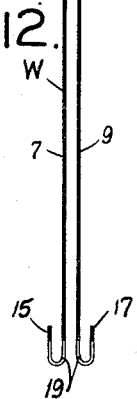
George H. Ashton,
George E. Nelson,
Inventors.
Koenig and Pope,
Attorneys.

Jan. 15, 1957 G. H. ASHTON ET AL 2,777,491
MANUFACTURE OF DRAW-CORD BAGS AND THE PRODUCT THEREOF
Filed Oct. 13, 1954 2 Sheets-Sheet 2
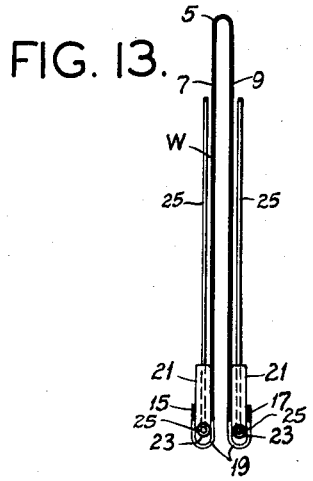
FIG. 13.
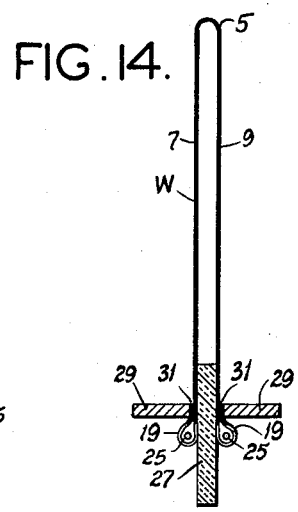
FIG. 14.
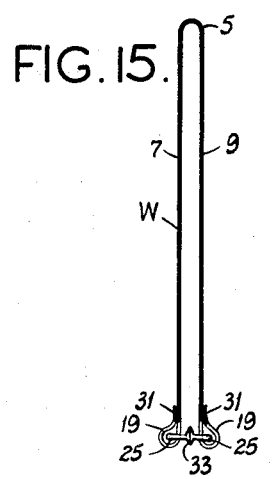
FIG. 15.
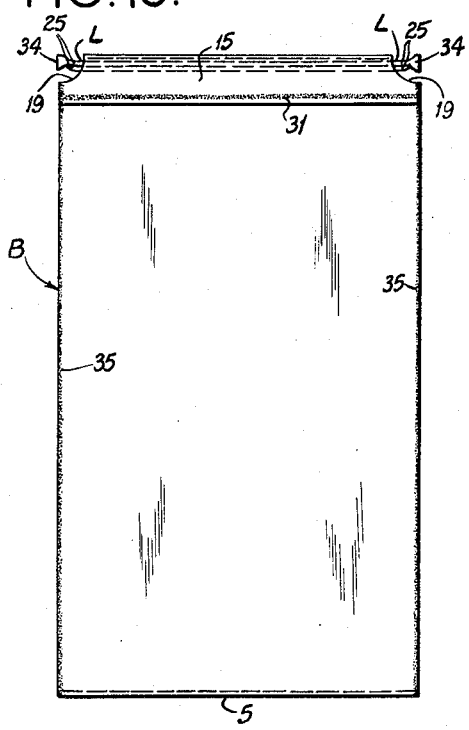
FIG. 16.
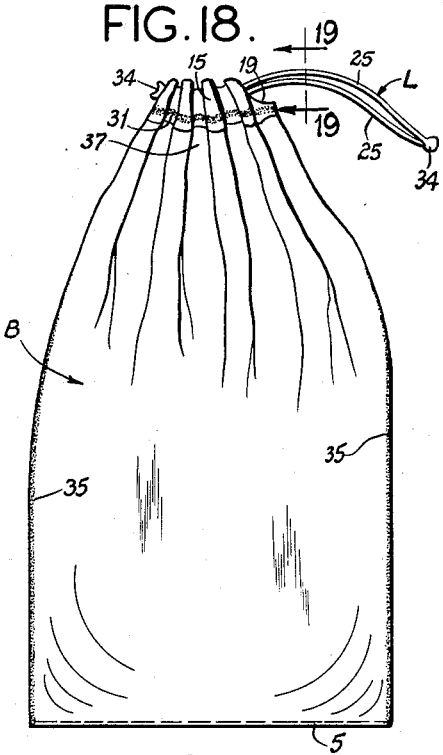
FIG. 18.
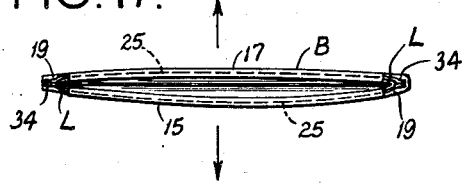
FIG. 17.
FIG. 19.
George H. Ashton,
George E. Nelson,
Inventors.
Koenig and Pope,
Attorneys.

United States Patent Office 2,777,491
Patented Jan. 15, 1957

2,777,491

MANUFACTURE OF DRAW-CORD BAGS AND THE PRODUCT THEREOF

George H. Ashton, Sappington, Mo., and George E. Nelson, Seattle, Wash., assignors to Bemis Bro. Bag Company, St. Louis, Mo., a corporation of Missouri Application October 13, 1954, Serial No. 461,987

16 Claims. (Cl. 150—11)

This invention relates to the manufacture of draw-cord bags and to the resulting bag product, and more particularly to plastic bags of this class.

Among the several objects of the invention may be noted the provision of draw-cord bags having improved draw-cord and other elements, said bags and associated cords having characteristics of greater strength, flexibility and convenience of handling; and the provision of a simple, rapid and economical production process for accurately making such bags in quantities. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various possible embodiments of the invention are illustrated, Figs. 1–8 are diagrammatic, flat plan views of tubing and webbing illustrating steps in the process of manufacturing the new draw-cord bags;

Figs. 9–15 are enlarged diagrammatic cross sections taken on lines 9—9, 10—10, 11—11, 12—12, 13—13, 14—14 and 15—15 of Figs. 1–7, respectively;

Fig. 16 is a front view of a finished empty and open bag made according to the invention;

Fig. 17 is a top plan view of Fig. 16;

Fig. 18 is a view like Fig. 16 but showing the bag filled and the mouth drawn shut; and, Fig. 19 is an enlarged cross section taken on line 19—19 of Fig. 18.

Corresponding reference characters indicate corresponding parts throughout the several views of the drawings.

Referring now more particularly to Figs. 1–8, there is shown at T a preformed flattened tubular sheet of flexible polyethylene plastic material having heat-sealing characteristics, i. e., the property of fusing between contacting areas under heat and pressure, with solidification in fused form after removal of the heat and pressure. Such flattened tubing is a known article of commerce and is supplied in various widths and gauges, wound on arbors. According to our invention, the tubing T (Figs. 1 and 9) is first withdrawn flatwise from such a winding. The withdrawn tubing has folds 3 and 5 joined by flat front and back portions 7 and 9.

As the tubing T is withdrawn, the fold 3 is pulled across a slitting knife 11 which slits open the tubing, as shown at 13. This operation constitutes a second step which converts the tubing T into a folded web W. In Fig. 2 a corner 8 of the front portion 7 is shown drawn back in order to illustrate how the fold 3 has been slitted. Fig. 10 shows the resulting open slit 13.

As a third step (Figs. 3 and 11), the marginal portions of the front and back 7 and 9 adjacent the slit 13 are folded oppositely out and back to form overlying marginal hem portions 15 and 17 overlying the front and back 7 and 9, respectively. The folded-back widths are approximately 1½ inch.

The fourth step (Figs. 4 and 12) is to punch out semicircular notches 19, these being at bag width intervals along the hem portions 15 and 17. The notches pass through the portions of the front and back 7 and 9 which underly the hem portions 15 and 17.

The fifth step (Figs. 5 and 13) consists in passing the front and back 7 and 9 between two elbow feed tubes 21, with the hems 15 and 17 cusped and overlying the outlets 23 of these tubes. Thus the outlet end of each tube 21 lies within the cusp of what will be referred to as an unfinished open hemmed portion. A heat-sealing vinyl plastic cord 25 is moved through each tube 21 and emerges from the opening 23 of the tube into the respective cusped hemmed portion. The rate of movement of the vinyl cords 25 and the web W is the same. Thus, the tube 21 turns the cords 25 so that they feed in line with the web W under in-folded hem portions 15 and 17 and in line with the semicircular notches 19. The cords therefore are exposed as a pair in the notches. In the hem portions, however, they are separated by the front and back portions 7 and 9.

The sixth step is illustrated in Figs. 6 and 14 wherein the margins of the folded hem portions 15 and 17 are heat sealed to the front and back 7 and 9, respectively, thus forming tubular hems containing the cords 25, as illustrated in Fig. 14. The heat sealing may be accomplished by inserting between the front and back 7 and 9 a piece of heat-insulating material 27 and pressing heated bars 29 towards the insulator 27. The purpose of the heat-insulating material 27 is to prevent the hems which are being heat sealed from sticking together during the heat-sealing process. The resulting heat seals are indexed 31.

In view of the above, it may be seen that there is produced at this stage a continuous multi-ply web W with hem portions 15 and 17 folded over the vinyl draw cords 25 and marginally sealed at 31 to the sides 7 and 9 to form tubular hems, with semicircular notches spaced along the hems and exposing the cords 25 at bag-width intervals. Bag lengths are determined by the width of the hemmed multi-ply web W.

The seventh step is shown in Figs. 7 and 15 wherein heated sealing elements have been applied with clamping pressure to the portions of the vinyl cord exposed at the openings 19. The result is that these cords are flatly joined together at intervals according to the intervals of openings 19, as shown at 33.

The eighth and final step is illustrated in Figs. 8 and 16 wherein a heated severing knife bar is employed to segment the web W at intervals in line with the centers of the notches 19 and intersecting the heat seals 33 of the cords 25. The result is severance of the web W including the cords into separated bags B having heat-sealed bag margins 35. Each bag is then constituted by a folded bottom 5, heat-sealed side seams 35, and heat-sealed tubular hems 15 and 17, through which extend the respective cords 25. The latter extend from the openings 19 where they are heat sealed at their ends as indicated at 34 to form a loop L passing through the hems.

To fill the bag, its mouth portions may be separated as shown by the arrows in Fig. 17. After filling, the mouth end may be closed by holding the draw cords 25 at one of the junctions 34 and pushing the mouth of the bag along the cords. This crinkles the bag mouth into a closure such as shown at 37 in Fig. 18. The bag may then be lifted for transportation by the extending portions of the loop L.

While solid plastic cords 25 may be used, it is preferable that they be tubular, as illustrated by the enlarged cross section shown in Fig. 19. Thus, the cords are easier to mash flat and join by heat sealing at 33 (Fig. 7). The heat seals 33 are then large enough for easy segmentation into the two junctions 34 (Fig. 8). Moreover, the tubular cords, for given strength and flexibility, form a more comfortable handhold for the bag.

One advantage of having at least the mouth forming bag composed of plastic and of having the draw-cord parts also formed of plastic is that such parts can be very effectively manipulated for bag closing and opening operations. An advantage of having the entire bag composed of plastic material is its resulting simple form and great strength.

Our method has many advantages, most of which are obvious from the above description. Among these is the fact that the notches 19 are produced after the hems 15 and 17 are turned back. This results in the margins of the opening 19 in the finished bag being coextensive which adds to the strength against tearing around the opening 19 (Fig. 16). The process is also one for which it is easy to design automatic machinery in order to carry it out. For example, simple draw rolls (not shown) located between the seventh and eighth steps may be used to supply the desired web movements, including dwell periods required for notching (Fig. 4), heat sealing at 33 (Fig. 7) and heat sealing and segmenting (Fig. 8). Such rolls, being effective on both the web W and cords 25, move them simultaneously at the same speed. It is to be understood, however, that our process is not restricted to any particular machinery for carrying it out. In any event, all of the bag forming operations are performed on a continuous web on which cutting, folding, punching, cord-inserting and sealing operations may be conveniently carried out.

Regarding exemplary (but not limiting) dimensions, for an 11 x 20 inch bag, a polyethylene sheet several thousandths of an inch thick may be used with a tubular vinyl cord of about 3/16 inch diameter, the hems being about 1½ inches wide.

It will be understood that the process may start with step 3 on a prefolded multiple ply sheet such as indicated in Fig. 2 (after splitting); also that the order of events in heat sealing and segmenting the cords and plies may be modified. For example, the web W may be transversely heat sealed in line with the heat seal 33 in step 7 and segmenting may occur in a later step. Or, simultaneous heat sealing and severing of the cords at 34 may be carried out in step 8, thus omitting step 7 as a separate step.

It will also be understood that the invention may be carried out for making bags of material other than the particular ones mentioned.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

We claim:

1. A bag comprising individual tubular hems at the mouth of the bag, the ends of which hems have adjacent openings at the corners of the mouth, and a length of heat sealing plastic cord located in each tubular hem and extending from the openings of said hem, said cords being heat sealed to one another at points outside of said openings and adjacent each corner.

2. A bag comprising a single sheet of heat sealing plastic, a fold forming a front, back and bottom portions, lateral heat seals forming side seams joining said front and back portions, marginal portions of said sheet opposite the bottom being respectively folded against the outsides of the respective front and back portions, heat sealed seams between the said folded marginal front and back portions forming a bag mouth having tubular hems, said hems having adjacent end openings at the bag corners, a length of heat sealing plastic cord extending through each hem, said cords being heat sealed at points adjacent to and outside of said openings.

3. A bag made according to claim 2 wherein all of the margins of openings adjacent each corner are of identical coextensive shape.

4. A bag made according to claim 2 wherein all of the margins of openings adjacent each corner are of identical coextensive shape and wherein said cords are of tubular cross sections.

5. In a bag, a heat sealable plastic mouth portion comprising tubular plastic portions, the ends of which have adjacent openings, a length of heat sealable cord extending through each tubular portion and emerging from its openings, adjacent ends of said cords being heat sealed adjacent said openings.

6. The method of making draw cord bags comprising folding back adjacent free edges of a longitudinally folded web having such edges, in order to form open hem portions on adjacent folded plies of the web, forming marginal notches extending through said open hem portions and plies, introducing a cord between each open hem portion and the ply from which the hem portion is folded, each cord traversing said notches, joining the margins of the open hem portions to said plies respectively to complete tubular hems containing said cords, effecting junctions at intervals between the plies of the web on the one hand and adjacent parts of the cords in the notches on the other hand along lines extending transversely of the web through said notches and segmenting the web and cords through said junctions.

7. The method of making plastic draw cord bags comprising folding back adjacent free edges of a longitudinally folded heat sealing plastic web having such edges, in order to form open hem portions on adjacent folded plies of the web, forming marginal notches extending through said open hem portions and plies, introducing a heat sealing plastic cord between each open hem portion and the ply from which the hem portion is folded, each cord traversing said notches, heat sealing the margins of the open hem portions to said plies respectively to complete tubular hems containing said cords, and heat sealing and severing the plies of the web on the one hand and adjacent parts of the cords in the notches on the other hand along lines extending transversely of the web through said notches.

8. The method of making plastic draw cord bags comprising folding back adjacent free edges of a longitudinally folded heat sealing plastic web having such edges, in order to form open hem portions on adjacent plies of the web, forming marginal notches extending through said open hem portions and plies, introducing a heat sealing plastic cord between each open hem portion and the ply from which the hem portion is folded, each cord traversing said notches, heat sealing the margins of the open hem portions to said plies respectively to complete tubular hems containing said cords, heat sealing the cords together in said openings and sealing the plies of the web along lateral lines at intervals corresponding to the intervals of said openings and severing the multi-ply web and the cords along said lines and through the cord seals.

9. The method of making plastic draw cord bags comprising withdrawing flat heat sealable plastic tubing from a winding thereof, slitting said tube to form a multi-ply web folded on one side and having coextensive free edges on the other side, folding back the respective free edges against the respective plies to form hem portions, forming marginal notches extending through said hem portions and plies, introducing heat sealable plastic cords respectively within said hem forming portions and in line traversing said notches, heat sealing the margins of the hem forming portions to said plies respectively to form complete tubular hems containing said cords, heat sealing adjacent parts of said cords in said openings and sealing the multi-ply web along lateral lines at intervals corresponding to the intervals of said openings, and severing the multi-ply web and the cords along said lines and through the cord seals.

10. In the manufacture of draw cord bags, the steps of forming a continuous web having two superimposed walls which are joined along one longitudinal edge of the web by an integral longitudinal fold and which have their other edges free and in superimposed relation, folding back marginal portions of the walls along longitudinal fold lines adjacent the free edges of the walls to form open hem portions on the outside of said walls, forming notches spaced at bag width intervals in the margin of the web having the open hem portions, introducing a cord between each open hem portion and the wall from which the hem portion is folded, the cords traversing the notches, joining the margins of the open hem portions to the respective walls to form complete tubular hems containing the cords, and segmenting the cords at the notches and segmenting the web along transverse lines spaced at bag width intervals and intersecting the notches.

11. In the manufacture of draw cord bags, the steps of forming a continuous web of heat sealable plastic having two superimposed walls which are joined along one longitudinal edge of the web by an integral longitudinal fold and which have their other edges free and in superimposed relation, folding back marginal portions of the walls along longitudinal fold lines adjacent the free edges of the walls to form open hem portions on the outside of said walls, forming notches spaced at bag width intervals in the margin of the web having the open hem portions, introducing a cord between each open hem portion and the wall from which the hem portion is folded, the cords traversing the notches, heat sealing the margins of the open hem portions to the respective walls to form complete tubular hems containing the cords, and segmenting the cords at the notches and heat sealing and segmenting the web along transverse lines spaced at bag width intervals and intersecting the notches.

12. A bag comprising a single sheet of heat sealing plastic, a fold forming a front, back and bottom portions, lateral heat seals forming side seams joining said front and back portions, marginal portions of said sheet opposite the bottom being respectively folded against the respective front and back portions, heat sealed seams between the said folded marginal front and back portions forming a bag mouth having tubular hems, said hems having adjacent end openings at the bag corners, a length of heat sealing plastic cord extending through each hem, said cords being heat sealed at points adjacent to and outside of said openings.

13. In the manufacture of draw cord bags, the steps of forming a continuous web having two superimposed walls which are joined along one longitudinal edge of the web and which at their other edges have marginal portions forming open hem portions, said web also being formed with openings spaced at bag width intervals in its margin which has the open hem portions, and having a cord between each open hem portion and the wall from which the hem portion is folded, the cords traversing the openings, joining the margins of the open hem portions to the respective walls to form complete tubular hems containing the cords, and segmenting the cords at the openings and segmenting the web along transverse lines spaced at bag width intervals and intersecting the openings.

14. In the manufacture of draw cord bags, the steps of forming a continuous web of heat-sealable material having two superimposed walls which are joined along one longitudinal edge of the web and which at their other edges have marginal portions forming open hem portions, said web also being formed with openings spaced at bag width intervals in its margin which has the open hem portions, and having a cord between each open hem portion and the wall from which the hem portion is folded, the cords traversing the openings, heat sealing the margins of the open hem portions to the respective walls to form complete tubular hems containing the cords, and segmenting the cords at the openings and heat sealing and segmenting the web along transverse lines spaced at bag width intervals and intersecting the openings.

15. In the manufacture of draw cord bags, the steps of forming a continuous web having two superimposed walls which are joined along one longitudinal edge of the web by an integral longitudinal fold and which at their other edges have folded-over marginal portions forming open hem portions, said web also being formed with notches spaced at bag width intervals in its margin which has the open hem portions, and having a cord between each open hem portion and the wall from which the hem portion is folded, the cords traversing the notches, joining the margins of the open hem portions to the respective walls to form complete tubular hems containing the cords, and segmenting the cords at the notches and segmenting the web along transverse lines spaced at bag width intervals and intersecting the notches.

16. In the manufacture of draw cord bags, the steps of forming a continuous web of heat-sealable plastic having two superimposed walls which are joined along one longitudinal edge of the web by an integral longitudinal fold and which at their other edges have folded-over marginal portions forming open hem portions, said web also being formed with notches spaced at bag width intervals in its margin which has the open hem portions and having a cord between each open hem portion and the wall from which the hem portion is folded, the cords traversing the notches, heat sealing the margins of the open hem portions to the respective walls to form complete tubular hems containing the cords, and segmenting the cords at the notches and heat sealing and segmenting the web along transverse lines spaced at bag width intervals and intersecting the notches.

References Cited in the file of this patent

UNITED STATES PATENTS

| | | |
|---|---|---|
| 1,818,030 | Arnold | Aug. 11, 1931 |
| 1,920,824 | West | Aug. 1, 1933 |
| 2,565,283 | Throckmorton | Aug. 21, 1951 |
| 2,656,769 | Hultkrans | Oct. 27, 1953 |

FOREIGN PATENTS

| | | |
|---|---|---|
| 475,548 | Canada | July 24, 1951 |